(12) United States Patent
Knoener et al.

(10) Patent No.: US 11,161,194 B2
(45) Date of Patent: Nov. 2, 2021

(54) SYSTEM AND METHOD FOR WELDING WITH INPUT CURRENT LIMITING

(71) Applicant: Illinois Tool Works Inc., Glenview, IL (US)

(72) Inventors: Craig S. Knoener, Appleton, WI (US); Ronald D. Woodward, Kaukauna, WI (US); Alan A. Manthe, Hortonville, WI (US); Jason A. Dunahoo, Green Bay, WI (US)

(73) Assignee: Illinois Tool Works Inc., Glenview, IL (US)

( * ) Notice: Subject to any disclaimer, the term of this patent is extended or adjusted under 35 U.S.C. 154(b) by 654 days.

(21) Appl. No.: 14/738,454

(22) Filed: Jun. 12, 2015

(65) Prior Publication Data

US 2016/0361777 A1 Dec. 15, 2016

(51) Int. Cl.
*B23K 9/12* (2006.01)
*B23K 9/10* (2006.01)
*B23K 9/09* (2006.01)

(52) U.S. Cl.
CPC .............. *B23K 9/125* (2013.01); *B23K 9/093* (2013.01); *B23K 9/1043* (2013.01); *B23K 9/124* (2013.01)

(58) Field of Classification Search
CPC ...... B23K 9/093; B23K 9/1043; B23K 9/124; B23K 9/125; H02J 2003/007; H02J 3/383; H02J 7/0068; H02M 7/66; H02S 40/32; Y02E 10/563; Y02E 60/76; Y04S 40/22

USPC .......................................... 219/124, 130, 133
See application file for complete search history.

(56) References Cited

U.S. PATENT DOCUMENTS

| | | | |
|---|---|---|---|
| 2003/0089693 A1 | 5/2003 | Hayes et al. | |
| 2014/0124492 A1* | 5/2014 | Daniel | B23K 9/095 |
| | | | 219/130.51 |
| 2014/0183176 A1* | 7/2014 | Hutchison | B23K 9/0956 |
| | | | 219/124.02 |
| 2014/0376268 A1 | 12/2014 | Manthe | |

FOREIGN PATENT DOCUMENTS

KR 101179256 9/2012

OTHER PUBLICATIONS http://www.millerwelds.com/om/o239988j_mil.pdf.
Database WPI, Week 198210, Thomson Scientific, London, GB ; AN 1982-18885E & JP S57 19183 A (Mitsubishi Electric Corp) Feb. 1, 1982 (Feb. 1, 1982).
International Preliminary Report on Patentability, Dec. 12, 2017, International Bureau of WIPO, 1211 Geneva 20, Switzerland.

* cited by examiner

*Primary Examiner* — Tu B Hoang
*Assistant Examiner* — Vy T Nguyen
(74) *Attorney, Agent, or Firm* — George R. Corrigan

(57) ABSTRACT

A method and apparatus for providing welding-type power is disclosed. The system includes a power supply, a wire feeder, and a controller. The wire feed speed is reduced when the input current exceeds a value to prevent tripping circuit breakers on the power line the welder is connected to. The speed reduction is based on an average current draw exceeding a threshold. The output voltage is reduced if the input current exceeds a second threshold.

20 Claims, 3 Drawing Sheets

SYSTEM AND METHOD FOR WELDING WITH INPUT CURRENT LIMITING

FIELD OF THE INVENTION

The present disclosure relates generally to the art of providing welding-type power. More specifically, it relates to welding-type power supplies used with wire feeders.

BACKGROUND OF THE INVENTION

Many applications exist for welding and cutting systems used to join two or more workpieces to one another, or to cut workpieces. These applications exist throughout industry, but also for construction, ship building, maintenance, and so forth. In arc welding systems, electrical power is converted to a form useful for a welding process, and the power provides voltage and current necessary to establish and maintain arcs between an electrode and a workpiece. Plasma cutting and similar operations also require conditioned power adapted for the specific process. In gas metal arc welding (GMAW), the arc is established between an electrode that is advanced towards the workpiece and the workpiece itself. The electrode is often provided by a wire feeder, that is part of the welding-type system. The electrode is consumed insomuch as it is added to the weld as the weld puddle advances during the operation.

Some prior art GMAW systems with wire feeders allow the user to set the wire feed speed and the output voltage. Wire feed speed is often referred to by the user as "heat" and voltage as "spread". Higher wire feed speeds require more current for the higher burn-off rate to maintain the same arc voltage. Prior art welding-type systems can be voltage-controlled (CV) or current-controlled (CC).

In welding and cutting power supplies, power electronic circuitry is commonly switched on and off to control the desired power output used for the process. The switching is commonly performed by pulse width modulation (PWM) signals applied to the gates of power electronic switches of converter circuits within the supplies. Conventional systems utilize a single inverter in this converter circuitry, along with an inductor to smooth the output waveform. However, inductors in such systems can be quite large, adding additional cost and weight. Improvements in these systems have included the use of two or more inverters or converters which are switched to provide the desired output. The ripple amplitude of the output current is thereby reduced, consequently reducing the size of the output inductor, or in some cases eliminating the output inductor. One improved prior art system is described in US Patent publication 2014-0376268 (hereby incorporated by reference).

Welding is generally a high power process, and welding-type systems often draw current near the capacity for the circuit powering the welding-type system. Welding-type systems have become efficient and are now made with a high power factor to reduce the likelihood of drawing so much input current that a circuit breaker is tripped. However, some welding-type systems are used with a variety of inputs, such as 240V/460V, or 120V/240V, and it is particularly difficult to draw enough input current at a lower voltage, when operating near the system's maximum output. For example, the Millermatic 211 Autoset w/MVP® welder can be operated on 120V and 240V, and when operated on a 20-amp 120V input it is possible to trip the circuit breaker absent some kind of limiting of the input current.

Prior art welding-type systems often simply allowed the external circuit breaker (i.e., the circuit breaker in the circuit the welding-type system is plugged into) to trip. This forced the user to stop the welding process, reset the breaker, and turn down the welding-type system output to avoid another breaker trip. This is, of course, frustrating to the user. Other prior art systems limit the current in the primary of the welding-type system to a level that avoids tripping the circuit breaker. This necessarily reduces the secondary current, which often causes the arc to suffer. This is also frustrating to the user—while they don't have to reset the breaker, until they reduce the output setpoint, the weld can suffer.

Some welding processes are best performed with an arc and without short circuits. However, sometimes the electrode inadvertently shorts to the work. Others welding processes are performed with intentional alternations between an arc state and a short circuit state. When a short forms, the arc voltage drops, and the current rises. A prior art attempt to avoid excess current draw (and tripping a breaker) was to detect when the breaker is about to trip. Then, the output voltage is reduced. However, simply reducing the voltage causes the process to spend more time in a short circuit state and less time in an arc state, resulting in higher average current. This results in further voltage reduction, which leads to even greater current, etc. This scheme helped avoid tripping the breaker, but caused the arc/weld to suffer.

Accordingly, a welding-type system that avoids tripping an external circuit breaker when operating near the breaker limit is desired. Preferably, this is accomplished without causing the arc and weld to suffer.

SUMMARY OF THE PRESENT INVENTION

According to a first aspect of the disclosure a welding-type system includes a power supply, a wire feeder, and a controller. The power supply receives an input current and a control input, and provides a welding-type power output. The wire feeder receives power from the power supply, and has a wire feed speed control input. The a controller has a wire feed speed control output that is connected to the wire feed speed control input and controls the wire feed speed. The controller also has a power command output to control the power supply. An input limiting module in the controller has a feedback input and a limiting output. The wire feed speed control output is responsive to the limiting output, and thereby the input current is responsive to the input limiting module.

According to a second aspect of the disclosure a method of providing welding-type power includes receiving an input current in a power circuit and switching the power circuit to provide a welding-type power output to an arc. Wire is fed to the arc at a user set speed, and then reduced below the user setpoint in response to an average of the input current exceeding a desired threshold.

The power supply is a voltage-controlled power supply or a current controlled power supply in various alternatives.

A feedback circuit provides, to the feedback input, a signal responsive to one or both of the input current and the output current of the of the welding-type system in another alternative.

The input limiting module includes a comparator that receives a threshold and receives the feedback input, and the limiting output is responsive to the comparator in one embodiment.

The input limiting module includes an averaging module that averages a difference between the threshold and the feedback input, and the limiting output is responsive to the average in various embodiments.

The controller includes a voltage command output connected to the power supply, and has an output voltage limiting module with a voltage limiting output that is responsive to a comparison between a second threshold and the feedback input, and the voltage command is responsive to the voltage limiting output in another alternative.

The limiting output is responsive to a user input indicative of wire size in one embodiment.

The threshold is determined based on the input current and circuit breaker characteristics in another embodiment.

Other principal features and advantages of will become apparent to those skilled in the art upon review of the following drawings, the detailed description and the appended claims.

Figure 1:
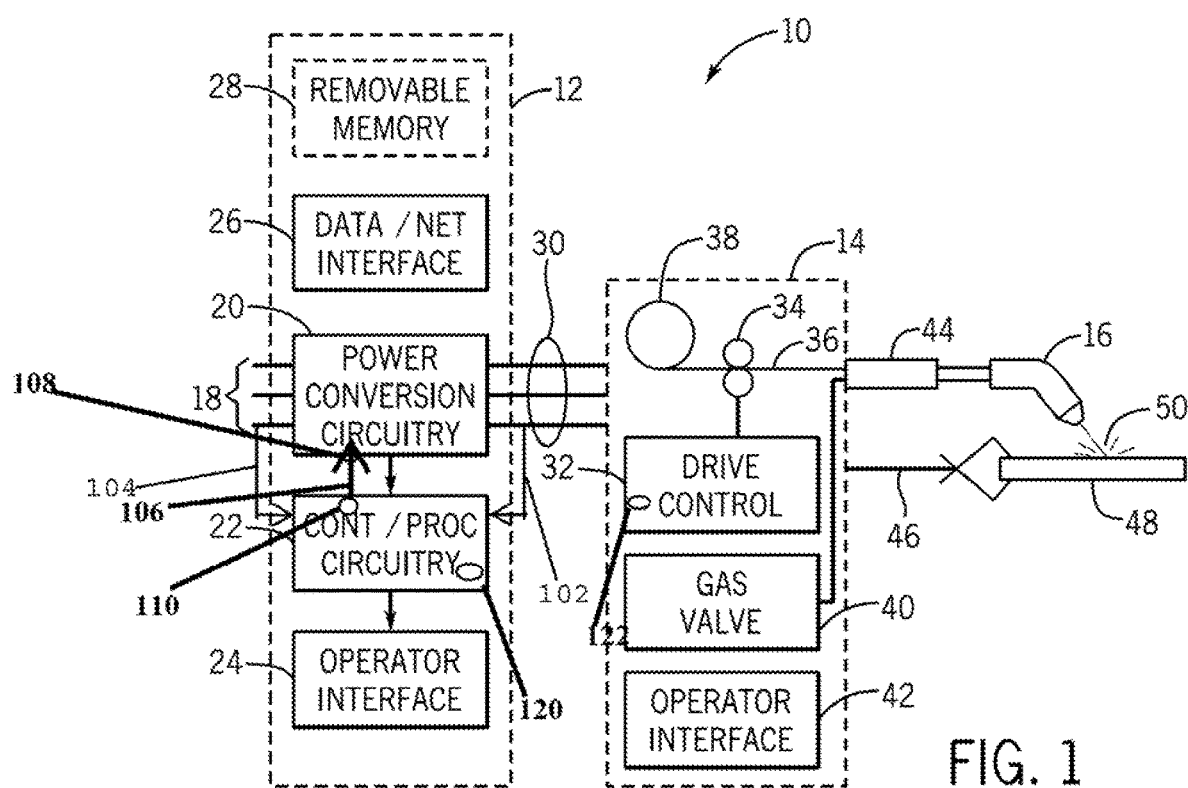
FIG. 1 is block diagram of a welding-type system.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular welding-type system with a particular power circuit and control scheme, used for particular welding processes, it should be understood at the outset that the invention can also be implemented with other welding-type systems, other power circuits and other control schemes, and used for other welding processes.

Generally, a welding-type system that provides for a reduced wire feed speed to avoid excessive input current (and to avoid tripping a circuit breaker) is disclosed. The controller reduces the wire feed speed (below a user set point) when an average sensed current exceeds a threshold. The magnitude of the reduction is preferably proportional to the amount the average exceeds the threshold. An average is used to filter instantaneous changes in the sensed current. The current that is sensed can be input current, output current, or an intermediate current. Preferably, the sensed current is indicative of the input current, and the threshold is chosen to represent an input current that does not cause a typical breaker to trip. When the wire feed speed is reduced, the system draws less input current, thus making it less likely to trip the circuit breaker. The sensed current is continuously monitored, and when it is below the threshold the wire feed speed returns to the setpoint.

Welding-type system, as used herein, includes any device capable of supplying welding-type power, including ancillary devices such as a wire feeder, robot, etc. Welding-type power, as used herein, refers to welding, plasma, induction heating power, or hot wire welding/preheating (including laser welding). Controller, as used herein, includes digital and analog circuitry, discrete or integrated circuitry, microprocessors, DSPs, etc., and software, hardware and firmware, located on one or more boards, used to control a device such as a power supply or power source.

Also, if the average sensed current exceeds a second threshold, then the output voltage is reduced. Preferably the second threshold is greater than the first threshold. This aspect is particularly useful when a welding-type system is used with a resistive load, such as when the welding-type system is being serviced or being tested in a lab. In such situations the wire feed speed reduction does not reduce the current draw, but the voltage reduction will reduce the current draw. The voltage reduction will also act as a backstop to the wire feed speed reduction, when welding is being performed.

Alternatives provide for using the same current sensors for both reducing speed and reducing voltage, or using different sensors. The different sensors can sense current at the same or different locations. The two thresholds are the same in other alternatives, and a time delay could be used to prevent the voltage reduction. The delay can start when the wire feed speed is reduced. If the current drops before the time delay expires, the voltage is not reduced. If the current stays above the threshold for the time delay, then the voltage is reduced. Also, a time delay could be used to trigger the wire feed speed reduction, rather than an averaging (if the current remains above the threshold for greater than the delay, the wire feed speed is reduced). Other alternatives provide for other speed reductions. A PID reduction could be used, rather than a proportional reduction. A series of step reductions could be used (initially reduce the wire feed speed, then if the sensed current remains above the threshold increase the reduction, etc.). The reduction could be based on other functions of the difference between the sensed average and the threshold.

The threshold is preferably set based on empirical data for typical breakers. Also, when the current is sensed other than on the primary, empirical data can be used to correlate the sensed current to the primary current, or it can be calculated using system efficiency, transformer turns, etc. Preferably, the magnitude of the speed reduction is dependent on the wire size (since that affects the current draw), and the user inputs the wire diameter.

Turning now to FIG. 1, a welding-type system 10 is a GMAW system, and in particular a MIG welding system. Other embodiment provide for system 10 being flux core or other wire fed process. In this example system a power supply 12 receives and converts power that is applied to a wire feeder 14. The wire feeder delivers the power to a welding torch 16 for completing a welding operation. Although the present disclosure used this GMAW power supply as an example for presentation of the new circuitry and control techniques, it should be understood that the same teachings may be applied to power supplies used for other welding processes, as well as for other metal-working processes, such as plasma cutting. Other than the control for wire feed speed reduction and output voltage reduction, welding-type system 10 operates as set forth in patent application 2014-0376268.

The power supply 12 receives input power 18 from any suitable source, such as the power grid, an engine generator set, hybrid power supplies, fuel cells, batteries, or a combination of these. Power conversion circuitry 20 converts the power to a form suitable for a welding (or other metal-working) process. The power supply may be designed to carry out multiple different welding processes that can be selected by an operator, and the power conversion circuitry includes components, such as solid state switches that allow for power conversion in accordance with the desired process. Power source 12 is preferably a voltage-controlled power source. Voltage-controlled power source (also called a CV power source), as used herein, is a power source wherein the output voltage is monitored, and the output is adjusted to provide the desired voltage. The voltage may be constant during the welding process, or may have a desired waveform of varying voltage. Other embodiments provide for using a current-controlled power source.

Control and processing circuitry 22 is coupled to the power conversion circuitry 20 and controls the operation of the power conversion circuitry during the selected process. For example, the control and processing circuitry 22 may provide signals that regulate the conductive states of solid state switches within the power conversion circuitry to produce the desired output power, as also discussed below, Power conversion circuitry 20 includes a power supply control input 108 and control and processing circuitry 22 has a power command output 110 connected to the power supply control input 108 via line 106. In many applications the control and processing circuitry will include one or more digital processors or microprocessors with associated memory to store and carry out the processes available on the power supply. Such processes may include constant voltage (CV) processes, constant current (CC) processes, pulsed processes, cutting processes, and so forth. Thus, power conversion circuitry 20 is a controlled current power supply in one embodiment and a controlled voltage power supply in another embodiment. The processes and other welding parameters may be selected via an operator interface 24 that is coupled to the control and processing circuitry 22. The power supply may further include circuitry that allows for communications with remote or networked components and systems, illustrated as data/network interface 26 in FIG. 1. Such circuitry may allow for monitoring of welding operations, logging of weld data, downloading or configuration of new processes and updates to processes, and so forth. Finally, the power supply will sometimes include removable memory 28 that may be used for storing processes, process parameters, system updates, and any suitable data.

Power and data may be transferred from the power supply 12 to the wire feeder 14 via one or more cables or cable bundles 30. The wire feeder itself comprises a drive control circuitry 32 that regulates the operation of a drive assembly 34. Drive control 32 along with control circuitry 22 together are the controller for system 10. The controller may include other control modules as well. The drive assembly 34 contacts and feeds a wire electrode 36 to the welding operation. The wire electrode is typically stored on a spool 38 within the wire feeder. The wire feeder may also include one or more gas valves for providing shielding gas for a welding operation. Finally, an operator interface 42 may allow certain parameters of the wire feeder to be selected, such as wire feed speed. The power supply and wire feeder may operate in coordination so that wire and gas resources are fed to the welding operation when power is provided for welding at the initiative of the welding operator (e.g., via a control on the torch). In some embodiments the power supply and wire feeder may be integrated into a single package. The wire and gas resources are provided via a weld cable 44 coupled to the torch. A second or work cable 46 is typically clamped or coupled in some manner to a workpiece 48 for completing the electrical circuit. The full circuit is completed during the welding operation by an arc as indicated at reference numeral 50.

Power circuit 20 preferably includes an input rectifier that converts AC power to DC power, a power factor correction boost circuit that receives the rectified input and provides a boosted bus to an isolated converter, preferably a dual two-switch interleaved forward converter that itself includes an output rectifier and an output inductor. Wire feeder 14 feeds the wire at a rate set by the user, and controller 22 causes power circuit 18 to provide an output at the current necessary for that wire feed speed, and at the desired voltage.

Figure 2:
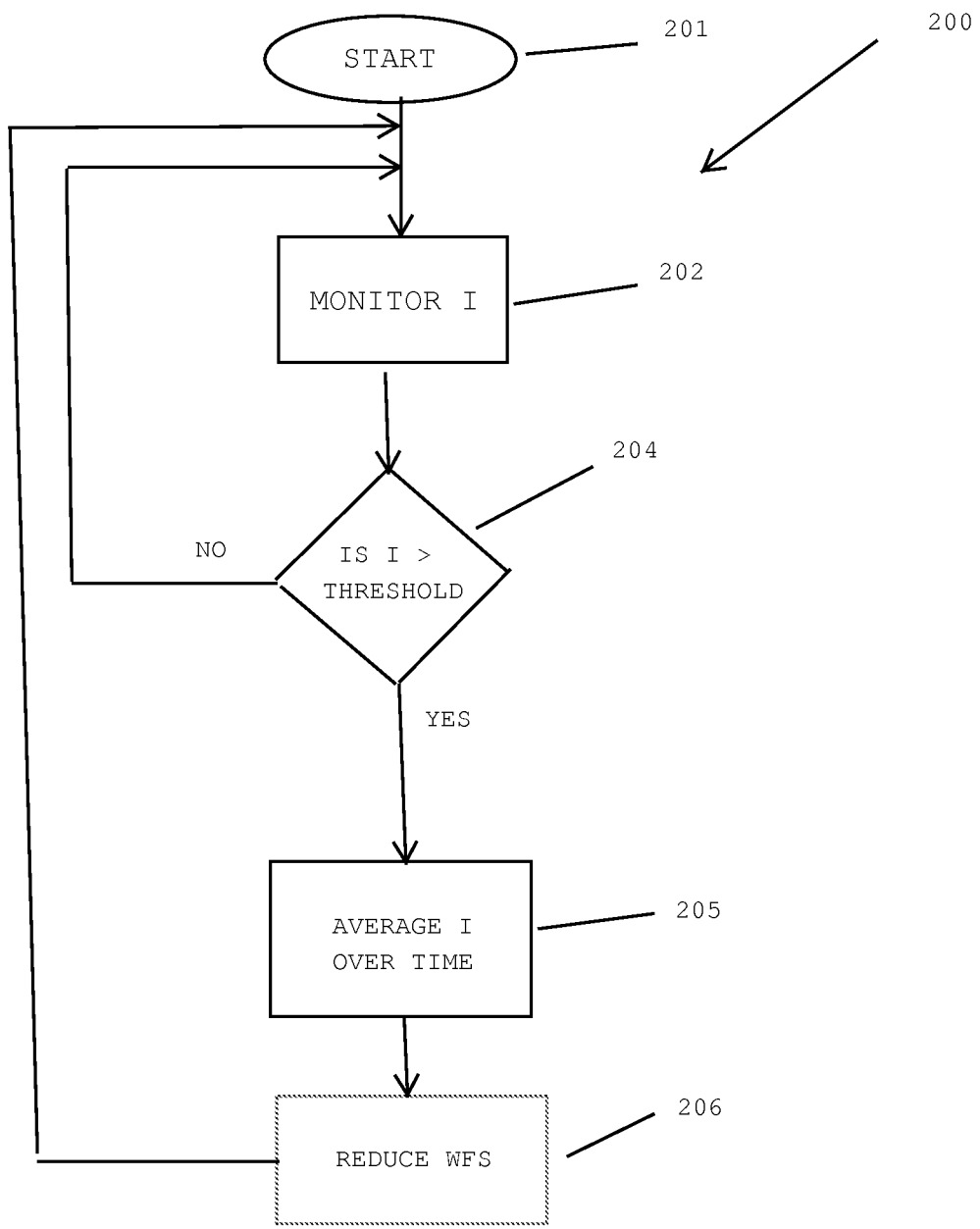
FIG. 2 is a flow chart of a control scheme to limit the wire feed speed and input current of a welding-type system.

Controller 22 includes an input limiting module 200, represented by the flowchart of FIG. 2. Preferably, input limiting module 200 is implemented in software, but it could be implemented by hardware or a combination thereof. Input limiting module 200 resides in software in controller 22 in the preferred embodiment, but may be part of drive control 32, or located elsewhere. The preferred embodiment provides that input limiting module 200 receive feedback responsive to the system output current on feedback line 102 (FIG. 1). Alternatives include receiving feedback responsive to the input current on line 104, or receiving feedback responsive to current elsewhere in system 100, such is within power circuit 18, or from electrode 36. Preferably, wherever the current feedback is obtained, it can be correlated to the system input current.

Input limiting module 200 implements a scheme that starts at step 201. The current feedback signal from line 102 (or elsewhere) is monitored at step 202. One embodiment provides for monitoring the current 20,000/second. Input limiting module, as used herein, is a module that acts to limit the input to a welding-type system below that which would otherwise be drawn, by controlling a power circuit. Module, as used herein, includes software and/or hardware that cooperates to perform one or more tasks, and can include digital commands, control circuitry, power circuitry, networking hardware, etc.

Then, the monitored current is compared to a threshold by a comparator 204. Comparator, as used herein, is software and/or hardware that compares one or more values, and provides an output responsive to the result of the comparison. The inputs to comparator 204 are the current feedback, and the threshold. In the preferred embodiment the threshold is the value that correlates to 27 A input current (i.e., whatever the magnitude of the feedback signal from 202 is when system 10 is drawing 27 amps input current). The preferred embodiment uses a sensed current on 102 of 130 A as correlating to 27 A on the primary (input). A typical 20 A breaker will not trip unless the current exceeds 27 A for a short period of time. A different threshold could be chosen, depending on the correlation between sensed and input current, breaker characteristics, and the system response time. If the sensed current is less than the threshold, the system continues to monitor the current at step 202.

If the fedback current is greater than (or equal to) the threshold, then the excess current (the amount over the threshold) is accumulated or averaged by averaging module 205. Averaging module, as used herein, includes a module that receives an input and provides an output responsive to the average of the input over time. Averaging module 205 is an IIR (infinite impulse response filter) with a corner frequency of 0.4 Hz in the preferred embodiment.

The wire feed speed command is reduced based on the average excess current. The inventors have empirically determined that when using 0.035 diameter wire, a reduction of 1.5 IPM (inches per minute) per excess amp helps reduce breaker trips without hurting the weld or arc. Thus, for each amp the average sensed current is greater than 130 A (which correlates to 27 A input), the wire feed speed is reduced by 1.5 IPM.

For example, if the sensed current on line 102 averages to 135 A, then input limiting module 200 will reduce the wire feed speed command by 5*1.5=7.5 IPM. The wire feed speed is set by the user (or by a program), and the command is provided by the controller via drive control 32. If the user set command was 100 IPM in the above example, input limiting module 200 would reduce the wire feed speed to 92.5 IPM. When the current drops below the threshold, input limiting module 200 causes the wire feed speed to return to the user set point in one embodiment. The wire speed command is updated 1000/sec in the preferred embodiment.

Reducing the wire feed speed command as described above causes the input current to be reduced such that the likelihood of a breaker trip is low. Also, reducing the wire feed speed does not result in the arc suffering.

Figure 3:
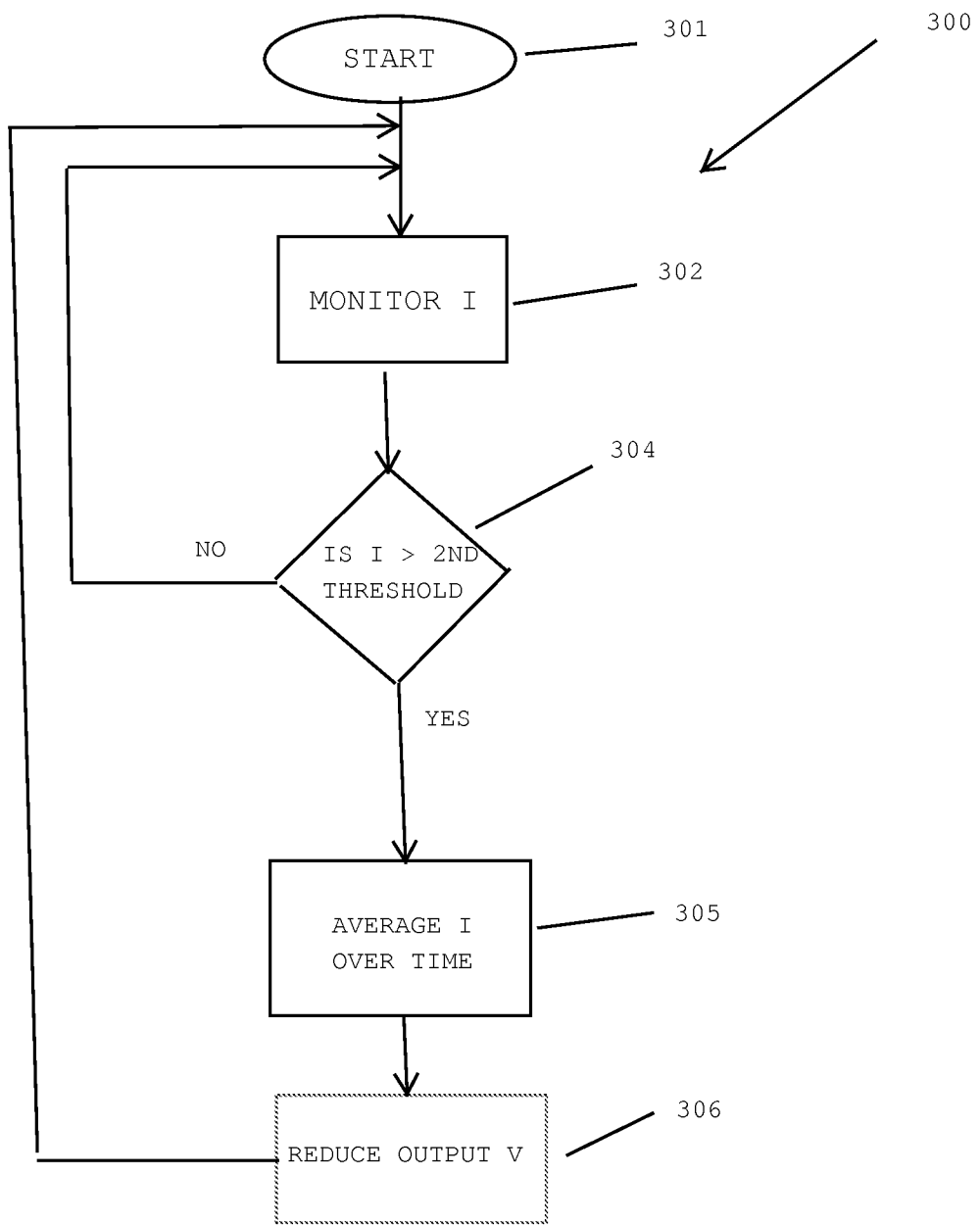
FIG. 3 is a flow chart of a control scheme to limit the output voltage of a welding-type system.

A safety or fallback voltage control loop is provided in one embodiment that works particularly well for resistive loads. FIG. 3 shows an output voltage limiting module 300 that operates in a manner similar to input limiting module 200, except the reduced parameter is output voltage. In this embodiment power command output 110 includes a voltage command output. Output voltage limiting module, as used herein, is a module that acts to limit the output voltage of a welding-type system below the voltage otherwise commanded, by controlling a power circuit.

Output limiting module 300 implements a scheme that starts at step 301. The current feedback signal from line 102 (or elsewhere) is monitored at step 302. One embodiment provides for monitoring the current 20,000/second. Then, the monitored current is compared to a second threshold by a comparator 304. The second threshold preferably correlates to 10% greater than the threshold for comparator 204, but it could be other values. The preferred embodiment uses a threshold of 143 A sensed on line 102, which correlates to a input draw of 29.7 A. If the fedback current is greater than (or equal to) the second threshold, then the excess current (the amount over the second threshold) is accumulated or averaged by averaging module 305. Averaging module 305 is an IIR filter with a corner frequency of 0.1 Hz in the preferred embodiment. The output voltage command is reduced based on the average excess current. The inventors have empirically determined that a gain of 0.17V/A for all wire diameters helps reduce breaker trips without hurting the weld or arc. Thus, for each amp the average sensed current is greater than 143 A (which correlates to 29.7 A input), the output voltage is reduced by 0.17V.

Reducing the output voltage helps further reduce the likelihood of a breaker tripping, particularly when the system is being tested or serviced on a resistive load.

The above example were given for 0.035 wire on a 120V input line. Other values are used for other inputs, or the foldback can be omitted at other inputs where breaker tripping is not an issue. Sampling rate and corner frequencies remain the same. Alternatives provide for other thresholds, other types of filter (FIR for example, with a set number of samples) different sampling rates, and using a delay or other functions instead of averaging.

Also, when a different wire size is used a different gain for input limiting module 200 is used at step 206. For a wire size of 0.024" a gain of 5.1 IPM/A is used (in other words, the wire feed speed is reduced by 5.1 IPM for every amp the average is over the threshold), for 0.030" wire a gain of 2.8 IPM/A is used, and as described above, for 0.035" wire a gain of 1.5 IPM/A is used. These gains have been empirically determined, but other gains could be used.

Alternatives include using code, hardware or both to implement these modules. One alternative includes having input limiting module 200 include the function of module 300. For example, comparator 304 could be after comparator 204 or step 206, (or elsewhere), with the appropriate actions taken in response to the comparison. Another alternative provides for using only module 200, or only module 300. The latter is particularly suited for non wire feed processes. Another alternative provides for making the comparison after the averaging.

Numerous modifications may be made to the present disclosure which still fall within the intended scope hereof. Thus, it should be apparent that there has been provided a method and apparatus for providing welding power with limiting of the input current that fully satisfies the objectives and advantages set forth above. Although the disclosure has been described specific embodiments thereof, it is evident that many alternatives, modifications and variations will be apparent to those skilled in the art.

Accordingly, the invention is intended to embrace all such alternatives, modifications and variations that fall within the spirit and broad scope of the appended claims.

The invention claimed is:

1. A welding-type system comprising:
 a power supply, receiving an input current and having a power supply control input and further having a welding-type power output for providing welding-type power to an arc;
 a wire feeder, disposed to provide wire to the arc, and having a wire feed speed control input; and
 a controller, including a wire feed speed control output connected to the wire feed speed control input, and further having a power command output connected to the power supply control input, and further including an input limiting module having a feedback input indicative of the input current, and a limiting output, and wherein the wire feed speed control output is responsive to the limiting output, and thereby the input current is responsive to the input limiting module.

2. The welding-type system of claim 1, wherein the power supply is at least one of a controlled current power supply and a controlled voltage power supply.

3. The welding-type system of claim 2, further comprising a feedback circuit having a signal responsive to at least one of the input current and an output current of the welding-type system, and connected to the feedback input.

4. The welding-type system of claim 2, wherein the input limiting module includes a comparator having as inputs a threshold and the feedback input, and wherein the limiting output is responsive to an output of the comparator.

5. The welding-type system of claim 4, wherein the input limiting module includes an averaging module, having as an input a difference between the threshold and the feedback input, and wherein the limiting output is responsive to an output of the averaging module.

6. The welding-type system of claim 4, wherein the controller includes a voltage command output connected to the power supply, and further wherein the controller includes an output voltage limiting module having a voltage limiting output responsive to a comparison of a second threshold and the feedback input, and wherein the voltage command is responsive to the voltage limiting output.

7. The welding-type system of claim 4, wherein the limiting output is responsive to a user input indicative of wire size.

8. A method of providing welding-type power comprising:
 receiving an input current in a power circuit;
 providing a welding-type power output to an arc;

feeding wire to the arc;

controlling the speed of the wire feeding, including feeding at a setpoint, and reducing the speed below the setpoint in response to a function of at least one of the input current and an output current exceeding a desired threshold.

9. The method of claim 8, wherein providing a welding-type power output includes providing at least one of a controlled voltage output and a controlled current output.

10. The method of claim 9, further comprising providing a signal responsive to at least one of the input current and an output current of the welding-type system, and wherein reducing the speed is in response to the providing a signal.

11. The method of claim 10, wherein reducing the speed is done in response to an average of at least one of the output current and the input current exceeding a desired threshold.

12. The method of claim 9, further comprising controlling the voltage output to be a voltage setpoint and controlling the output voltage to be less than the voltage setpoint in response to an average of at least one of the output current and the input current exceeding a second threshold.

13. The method of claim 9, wherein the magnitude of the reducing is responsive to a user input indicative of wire size.

14. The method of claim 9, wherein the desired threshold is determined based on the input current and circuit breaker characteristics.

15. A system for providing welding-type power comprising:

means for receiving an input current in a power circuit;

means for providing a welding-type power output to an arc in response to the means for receiving;

means for feeding wire to the arc, wherein the wire receives the welding-type power output;

means for controlling the speed of the means for wire feeding to be a set speed and for reducing the speed below the set speed in response to a function of at least one of the input current and an output current exceeding a desired threshold.

16. The system of claim 15, wherein the welding-type power output is at least one of a controlled voltage output and a controlled current output.

17. The system of claim 16, wherein the means for reducing includes means for averaging the input current exceeding a desired threshold.

18. The system of claim 17, wherein the means for controlling switching receives a voltage setpoint and includes means for controlling the output voltage to be less than the voltage setpoint when the averaging exceeds a second threshold.

19. The system of claim 18, wherein the means for reducing the speed is responsive to a user input indicative of wire size.

20. The system of claim 19, further comprising means for providing feedback is responsive to at least one of the input current and an output current of the welding-type system, and wherein the means for reducing responsive to the means for providing feedback.

* * * * *